July 9, 1963

H. J. BIHELLER 3,096,985

EMERGENCY SHAFT SEALING DEVICE

Filed Dec. 14, 1961

HANS JOSEPH BIHELLER
*INVENTOR.*

BY Daniel W. Bobis
atty

July 9, 1963   H. J. BIHELLER   3,096,985
EMERGENCY SHAFT SEALING DEVICE
Filed Dec. 14, 1961   2 Sheets-Sheet 2

HANS JOSEPH BIHELLER
INVENTOR.

United States Patent Office 3,096,985
Patented July 9, 1963

3,096,985
EMERGENCY SHAFT SEALING DEVICE
Hans Joseph Biheller, Lodi, N.J., assignor to Worthington Corporation, Harrison, N.J., a corporation of Delaware
Filed Dec. 14, 1961, Ser. No. 159,367
4 Claims. (Cl. 277—27)

This invention relates generally to shaft seals. More particularly the invention relates to a sliding emergency shaft sealing device.

The use of emergency seals in the prior art had the disadvantage of not being directly operably responsive to the pressure in the system on failure of the primary seal.

It is the object of the present invention to overcome this difficulty.

In accordance with the present invention an emergency shaft sealing device for a turbomachine is provided and comprises a casing having a shaft disposed therein. The shaft is connected to a source of power adapted to rotate said shaft. A mechanical seal is engaged in sealed relationship between the casing and the shaft. A sleeve member slidably disposed in the casing is normally out of engagement with the shaft and is adapted to engage the shaft in sealed relationship therewith on failure of the mechanical seal.

One of the objects of this invention is to provide an emergency seal normally not engaged with the shaft.

Another object of this invention is to provide for the emergency seal to engage the shaft on failure of the primary seal.

Another object of this invention is to provide an emergency seal which engages the shaft on failure of the primary seal to break down the pressure of the leakage flow and thereby limit it.

With these and other objects in view as may appear from the accompanying specification, the invention consists of various features of construction and combination of parts which will be first described in connection with the accompanying drawings, showing the emergency shaft sealing device of a preferred form and the features forming the invention will be specifically pointed out in the claims.

Figure 1:
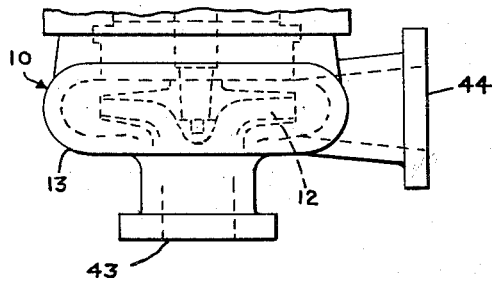
FIGURE 1 is a partial elevation view of a turbomachine in which the present invention is embodied.

Referring more particularly to the drawings, FIGURE 1 shows a turbomachine 10 in which the novel emergency shaft sealing device 11 is embodied, but it is understood that the invention is not limited merely to turbomachinery and can be used with any mechanism so long as there exists a pressure differential across the length of the shaft thereof.

The turbomachine 10 shown in FIGURE 1 is a pump having an inlet 43 and an outlet 44 but it could have been a compressor or another type pump in which there is a driving impeller 12 in the casing 13 mounted on a shaft 14 which is connected to a suitable source of power (not shown).

Figure 2:
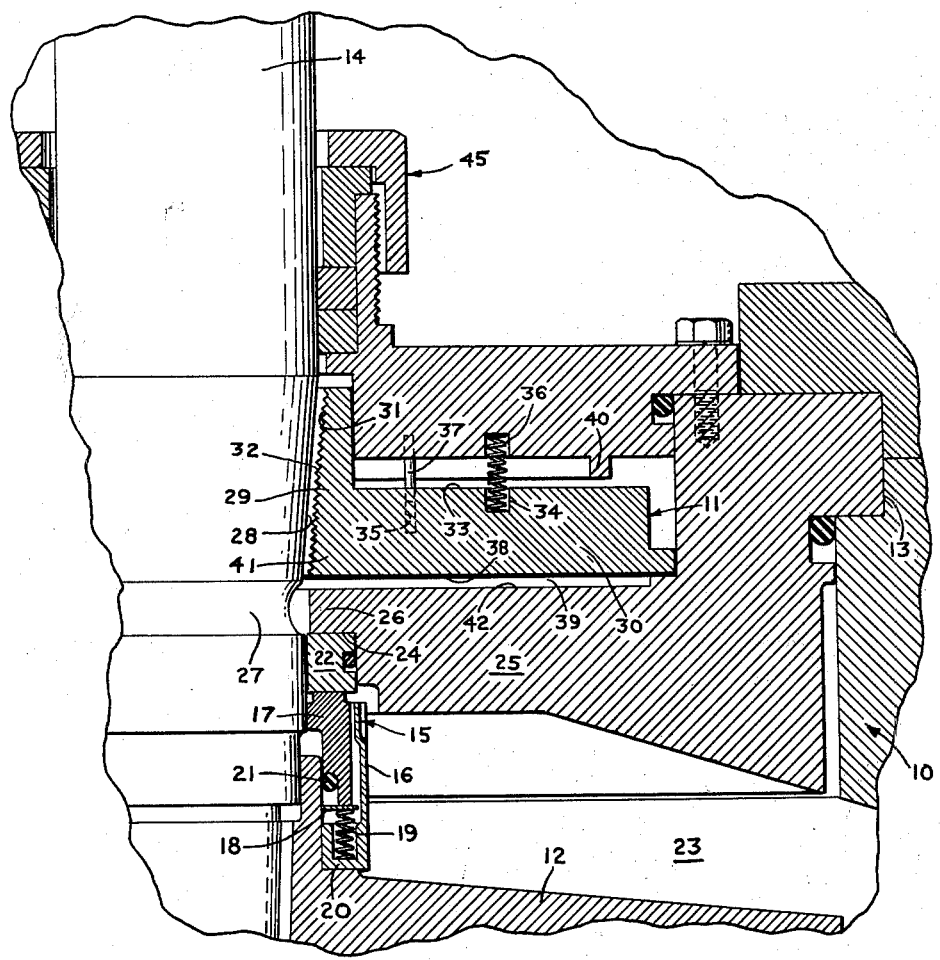
FIGURE 2 is a fragmentary view showing a preferred form of the invention.

FIGURE 2 shows the normal operative position of turbomachine 10 in which the primary seal 15 is a mechanical seal 16 including sealing member 17, washer 18, spring 19, spring holder 20 and O-ring seal 21. The spring holder 20 is connected to the impeller 12 and a plurality of springs 19 are disposed therein to urge washer 18 and sealing member 17 against wearing ring 22 thus preventing fluid in pumping chamber 23 from passing inwardly therethrough.

Wear ring 22 is connected to the recess 24 of the flange 25 which has its end 26 in spaced relationship to groove 27 of the shaft for reasons described hereinafter. The shaft as illustrated in FIGURE 2 has a tapered section 28 inboardly of the groove 27. A typical stuffing box is shown as at 45 about the shaft 14.

Figure 3:
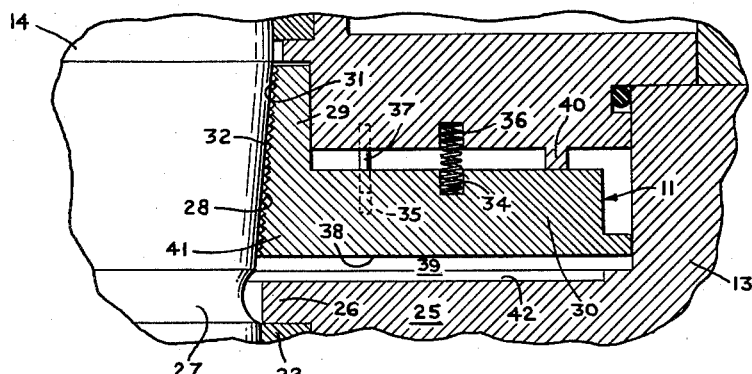
FIGURE 3 is a fragmentary view showing the emergency sealing device engaging the shaft after failure of the primary seal.

Emergency shaft sealing device 11, generally described as sleeve member 29, is slidably disposed in the casing 13 in superposition above tapered section 28 and normally out of engagement therewith as illustrated in FIGURES 2 and 3. Flange 30 is formed on the outboard end 41 of sleeve member 29 and slidably engages the casing 13.

Figure 4:
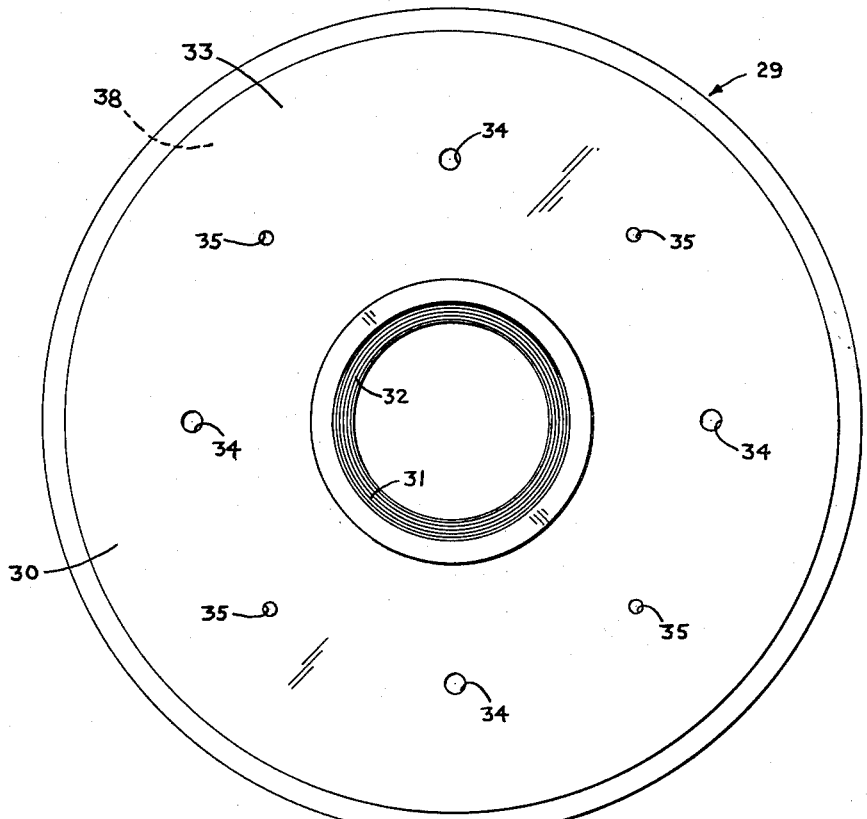
FIGURE 4 is an inboard face view of the sleeve member looking from the inboard face thereof.

Sleeve member 29, as shown in FIGURES 2, 3 and 4, has a tapered inner periphery 31 which corresponds to the tapered section 28 of the shaft 14 and has a serrated edge 32 thereon; but the edge 32 could be any desired shape, such as smooth. The inboard face of flange 33 has circumferentially alternating bores 34 and 35. Spring means 36 is disposed in bore 34 of the flange to urge the sleeve member 29 out of engagement with the tapered section 28 of the shaft 14. Pin 37 is fixedly connected to the casing 13 and is slidably disposed in bore 35 for purposes more fully described hereinafter.

*Operation*

During normal operation of turbomachine 10 the primary seal 15 contains the liquid being energized therein. Accordingly, sleeve member 29 is maintained in the position shown in FIGURE 2 by the force of springs 36 with the inner periphery 31 out of engagement with the tapered section 28 of the shaft 14. The outborad face 38 of the flange 30 is subjected to atmospheric pressure which cannot overcome the force of springs 36.

However, on failure of the primary seal 15 the pressurized fluid will pass through the space between the end 26 of the flange 25 and the groove 27 of the shaft 14 and thus be directed against the outboard face 38 of flange 30. The pressurized fluid will urge the sleeve member 29 axially inwardly for the pressure thereof is greater than the force of springs 36. The pressure in the chamber 39 between the outboard face 38 of flange 30 and the inboard face 42 of flange 25 will be substantially equal to that of the pumping chamber 23 and will force the serrated edge 32 of the sleeve member 29 to engage the tapered section 28 of the shaft 14.

FIGURE 3 illustrates the emergency shaft sealing device 11 operatively engaging tapered section 28 of the shaft 14. The compression of spring 36 is limited by annular stop 40 which also serves to prevent fluid from chamber 39 which may have passed through the slidably engaged casing 13 and flange 30 from passing any further.

Pins 37 allow the axial displacement of sleeve member 29 but prevent rotation thereof.

The serrated edge 32 of sleeve member 29 on engaging the tapered section 28 acts as a labyrinth and breaks down the pressure of the pressurized fluid in a manner well known in the art, thus either eliminating or severely limiting leakage therethrough.

It will be understood that this invention is not to be limited to the specific construction or arrangement of parts shown, but that they may be widely modified within the invention defined by the claims.

What is claimed is:

1. An emergency shaft sealing device for a turbomachine comprising:
   (a) a casing having an inlet and an outlet therein,
   (b) a shaft rotatably disposed in said casing and connected to a source of power, (c) an impeller mounted on said shaft and adapted to energize fluid in said turbomachine, (d) a first flange formed on the inner periphery of said casing inboard of said impeller and extending radially inwardly therefrom, (e) a mechanical seal connected to said first flange and engaging said shaft in sealed relationship therewith, (f) a sleeve member slidably disposed in said casing inwardly of said first flange and normally out of engagement with said shaft, (g) a second flange formed on the end of said sleeve member adjacent said first flange and extending radially upward to slidably engage said casing, (h) said shaft having a tapered section in juxtaposition with said sleeve member, (i) said sleeve member having a tapered inner periphery corresponding to said tapered section of said shaft, (j) spring means urging said sleeve member normally out of engagement with said shaft, (k) the side of said second flange adjacent said first flange normally subjected to atmospheric pressure and on failure of said mechanical seal the fluid in said turbomachine leaking therethrough to subject the side of said second flange to a pressure greater than that of the force of said spring means to force said sleeve member to engage said shaft and form a sealed relationship therewith.

2. The combination claimed in claim 1 wherein:
said inner periphery of said sleeve member has a serrated edge adapted to form a labyrinth seal on engagement with said tapered section of said shaft.

3. The combination claimed in claim 2 wherein:
an annular indentation on said shaft in juxtaposition to said first flange whereby on failure of said mechanical seal the pressurized fluid will pass therebetween and be directed against said second flange thereby overcoming the force of the spring means and forcing said sleeve member to engage said shaft.

4. The combination claimed in claim 3 wherein:
means operatively associated with said second flange to permit axial movement of said sleeve member and to prevent rotation thereof.

References Cited in the file of this patent

UNITED STATES PATENTS 3,033,579    Seaver _____ May 8, 1962

FOREIGN PATENTS 181,635    Great Britain _____ June 22, 1922